Dec. 30, 1969 F. W. LAFFERT, JR 3,487,271

SOLDER PELLET WITH MAGNETIC CORE

Filed Sept. 21, 1967

INVENTOR.
FREDERICK W. LAFFERT, JR.
BY Isidore Togut
ATTORNEY

United States Patent Office 3,487,271
Patented Dec. 30, 1969

3,487,271

SOLDER PELLET WITH MAGNETIC CORE

Frederick W. Laffert, Jr., Lynnfield, Mass., assignor to International Telephone and Telegraph Corporation, Nutley, N.J., a corporation of Maryland Filed Sept. 21, 1967, Ser. No. 669,476
Int. Cl. H01l 3/00, 5/00, 15/00
U.S. Cl. 317—234 5 Claims

ABSTRACT OF THE DISCLOSURE

This invention is for a solder pellet for a semiconductive device wherein the solder pellet contains magnetically permeable material.

BACKGROUND OF THE INVENTION

Figure 1:
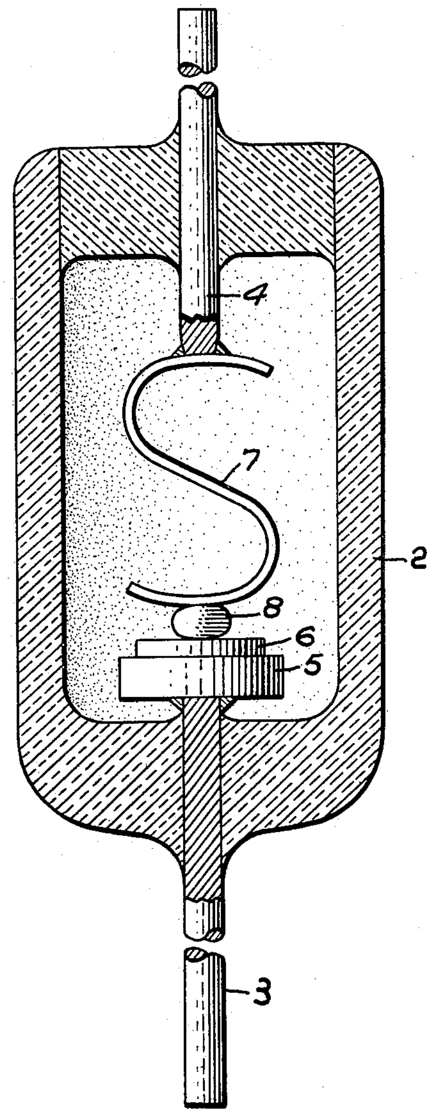

In the manufacture of semiconductive devices, such as diodes, it is the usual practice to have a glass housing and electrode leads at either end of said housing fused into the glass housing. In the manufacture of the diodes the practice is to make first the first seal which comprises the glass housing and one electrode fused to the glass housing. Then the following items are placed on top of the electrode which protrudes into the glass housing; first the solder pellet and then the semiconductive wafer, which is formed from semiconductive material and after being properly diffused to provide the P-N junction therein one surface of the wafer is covered with gold and on the opposite surface is disposed a solder dot. The orientation of the semiconductive wafer with respect to the solder pellet is to have the gold surface on top of the solder pellet and the solder dot opposite thereto and that in turn is later, in a subsequent operation, brazed or soldered to the second electrode.

However, in the process of inserting the solder pellets and the semiconductive wafer on top of the first electrode in the glass housing it sometimes happens, in random fashion, that the semiconductive wafer is rotated 180° so that the solder dot rests upon the solder pellet and the gold surface of the semiconductive wafer is uppermost. The problem then is to reverse this orientation. Generally this is done by vibrating the first seals containing the solder pellet and the semiconductive wafer in a fixture and by agitating the two parts in order to flip over the semiconductive wafer and have the gold surface come to rest upon the solder pellet. But it often occurs that in such vibration step not only is the semiconductive wafer flipped over but the solder pellet is also unwantedly flipped over so that the semiconductive wafer rests on the electrode lead and the solder pellet on top of the semiconductive wafer. In such a case it is necessary to remove the first seal completely from the fixture to restore the correct relation of the parts. It can be understood that such happenings cause a loss of efficiency in the operation of making the diode.

It is therefore an object of this invention to provide an improved solder pellet which in conjunction with the manufacturing techniques will obviate this defect in the prior art and insure that the solder pellet will always remain on top of the first electrode during the vibration process.

A feature of this invention is a semiconductive device comprising a semiconductive wafer, which has on one surface a layer of gold, or similar soft solderable material, and on the opposite surface a solder dot, the gold layer and the solder dot comprising ohmic connections to the semiconductive wafer, a conductive lead, and a solder pellet having magnetically permeable material disposed intermediate the gold layered surface of the semiconductive wafer and conductive lead and electrode, connected to the solder dot and the solder pellet.

DESCRIPTION OF THE INVENTION

The above mentioned and other features and objects of this invention will become more apparent by reference to the following description taken in conjunction with the accompanying drawings, in which:

FIG. 1 shows a cross-sectional view of a semiconductive diode; and

Figure 2:
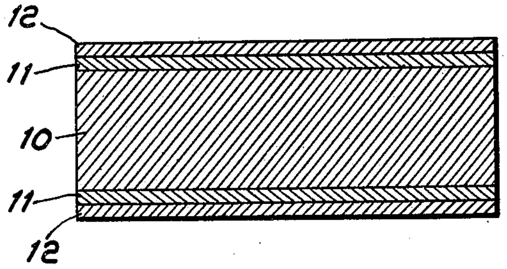

FIG. 2 which shows a cross-section of the solder pellet of this invention.

With reference to FIG. 1, there is shown a cross-section of a semiconductive diode 1 which comprises a glass envelope 2 and conductive leads 3 and 4 extending from the extremities of the glass envelope 2. The conductive leads 3 and 4 are fused to the glass envelope by conventional techniques such as, for example, the application of heat to fuse the glass about the electrodes. A solder pellet 5 is fused to the lower electrode 3 and soldered to the solder pellet 5 is the semiconductive die 6. An S lead 7 is made to make contact to the semiconductive die 6 by means of the solder dot 8 which is disposed on top of the die 6. The S lead 7 in turn is brazed to the electrode 4. In the manufacture of the diode the glass housing with the electrode 3 fused thereto is loaded in a fixture called a solder boat, by inserting the electrode into a hole large enough to accept the electrode wire but too small for the glass housing. An example of such a fixture is shown in U.S. Patent No. 3,061,919. The solder boat can hold a great many such housings. Then the solder pellet 5 and the semiconductive die are loaded automatically without regard to orientation. The pellet of course is loaded first and then the semiconductive die is loaded on top of the pellet. Orientation of the semiconductive wafer to have the gold layered surface in contact with the solder pellet is accomplished by vibration or pulsation of the solder boat holding a multiplicity of the first seals which consist of the glass envelope 2, the electrode 3 fused to the glass envelope, the solder pellet 5 and the semiconductive die 6. It should be understood that the other electrode 4 with the S lead 7 is connected to the glass envelope and the semiconductive die in a subsequent operation. The solder boat is then pulsed or vibrated in order to orient the semiconductive die 6 (the solder dot), if it is not already in the up position, and the gold surface on the bottom of the semiconductive die 6 will be contiguous with the solder pellet 5. However, it may occur that in this pulsation or vibration procedure not only is the die 6 flipped over but the pellet 5 will also be flipped and a disorientation of the parts will occur in that the semiconductive die 6 will be on top of the electrode 3 and the pellet 5 on top of the die 6. Or it may happen that the parts may be further disoriented in that they would be on the side of the glass envelope and parallel in some fashion with the electrode 3. The conventional solder pellets are made with a copper core covered on both sides with gold and the gold in turn is covered with a solder or low melting point tin alloy. The improved solder pellet of this invention is illustrated in FIG. 2 and is shown as having a magnetically permeable core which can be Kovar. The core 10 is covered on both sides with a layer of gold 12 and the gold layer in turn is covered with a layer of solder 12 which as stated before, can be a low melting tin alloy.

In the operation of orienting the improved solder pellet 5 with the magnetically permeable core and the semiconductive die 6, it is proposed to dispose a magnetic field either above or below the solder boat (not shown) to hold the pellet in place on top of the electrode 3 so that during pulsation the pellet will not flip and displace the relative location of pellet and die. The apparatus for accomplishing the pulsation or vibration of the solder boat is well known in the art and is not illustrated and the provision of a magnetic field is one that is also well known in the art for loading articles but has not heretofore been utilized in such a device for this purpose.

For instance, an electromagnet can be mounted on top of the vibration (or pulsation) apparatus just beneath the solder boat, which is disposed therein with the glass housings upper most.

While the principles of the invention have been described above in connection with specific embodiments, and a particular modifications thereof, it is to be clearly understood that this description is made only by way of example and not as a limitation on the scope of the invention.

I claim:

1. A semiconductor device including an insulating housing, said housing having a hollow chamber therein and a first and second hole at opposite ends of said housing, a first and second conductive lead extending through said first and second hole, respectively, and into said chamber, comprising:

- a solder pellet containing magnetically permeable material, said pellet in juxtaposition with said first conductive lead within said chamber;
- a semiconductor die with one surface thereof in juxtaposition with said pellet;
- a solder dot in juxtaposition with the opposite surface of said semiconductor die; and
- means electrically and mechanically coupling said solder dot to said second conductive lead.

2. A semiconductor device according to claim 1 wherein said semiconductor die has one surface of soft solderable material, said one surface being attached to said pellet.

3. A semiconductor device according to claim 2 wherein said soft solderable material is gold.

4. A semiconductor device according to claim 1 wherein said coupling means includes an S shaped lead, one end of said S shaped lead being attached to said solder dot and the other end of said S shape lead being attached to said second conductive lead.

5. A semiconductor device according to claim 1 wherein said solder pellet comprises:

- a layer of magnetically permeable material;
- a first and second layer of gold, each gold layer being disposed on opposite sides of said layer of magnetically permeable material; and
- a first and second layer of solder disposed on said first and second gold layers respectively.

References Cited

UNITED STATES PATENTS

| | | | |
|---|---|---|---|
| 2,796,563 | 6/1957 | Ebers et al. | 317—235 |
| 3,025,439 | 3/1962 | Anderson | 317—240 |
| 3,147,414 | 9/1964 | Pelfrey et al. | 317—240 |
| 3,261,075 | 7/1966 | Carman | 29—25.3 |
| 3,266,137 | 8/1966 | De Mille et al. | 29—473.1 |

JOHN W. HUCKERT, Primary Examiner

R. F. POLLISACK, Assistant Examiner

U.S. Cl. X.R.

317—235, 240